Dec. 18, 1962 J R. WRIGHT 3,069,656
REMOTE READING APPARATUS

Filed Oct. 14, 1957 4 Sheets-Sheet 1

INVENTOR.
J RONDLE WRIGHT
BY
Busser, Smith & Hardy
ATTORNEYS

INVENTOR.
J RONDLE WRIGHT
ATTORNEYS

Dec. 18, 1962    J R. WRIGHT    3,069,656
REMOTE READING APPARATUS
Filed Oct. 14, 1957    4 Sheets-Sheet 3

INVENTOR.
J RONDLE WRIGHT
BY
ATTORNEYS

INVENTOR.
J RONDLE WRIGHT

United States Patent Office 3,069,656
Patented Dec. 18, 1962

3,069,656
REMOTE READING APPARATUS
J Rondle Wright, Newtown Square, Pa., assignor to Sun Oil Company, Philadelphia, Pa., a corporation of New Jersey
Filed Oct. 14, 1957, Ser. No. 689,870
4 Claims. (Cl. 340—151)

This invention relates to a remote reading apparatus and, more particularly, relates to the reading, from a local station, of simultaneously existing conditions at a plurality of remote stations.

Numerous types of apparatus are known in the art for providing indications of the level of fluid in a tank, and numerous devices have been proposed for providing at a local station indications of the levels of a plurality of remote tanks. The apparatus heretofore employed for these purposes requires the use of a plurality of electrical conductors between the individual remote tanks and the local station and also requires the lapse of considerable time between reading the level in the first tank and the reading of the level of the last tank of a group of tanks, with the result that the levels in the tanks may have changed significantly during the reading period. Thus, there is not obtained an accurate indication of the total amount of liquid contained by the tanks at any given time.

It is an object of this invention to provide apparatus controlled from a local station whereby there may be received at the local station successively transmitted readings of interpretations of a condition existing simultaneously at each of a plurality of remote stations. Thus, for example, there can be determined at a local station a measure of the total quantity of fluid contained in a plurality of tanks at any given time. While the apparatus described herein relates to measurement of liquid level in a plurality of tanks, it will be evident that the invention has broad general remote reading application.

It is a further object of the invention to provide the foregoing local reading by means of a relatively simple system employing only a single electrical conductor plus a common ground wire extending from each remote station to the local station.

These and other objects of the invention relating to the apparatus involved herein will become evident from the following description when read in conjunction with the accompanying drawings, in which.

Figure 1:
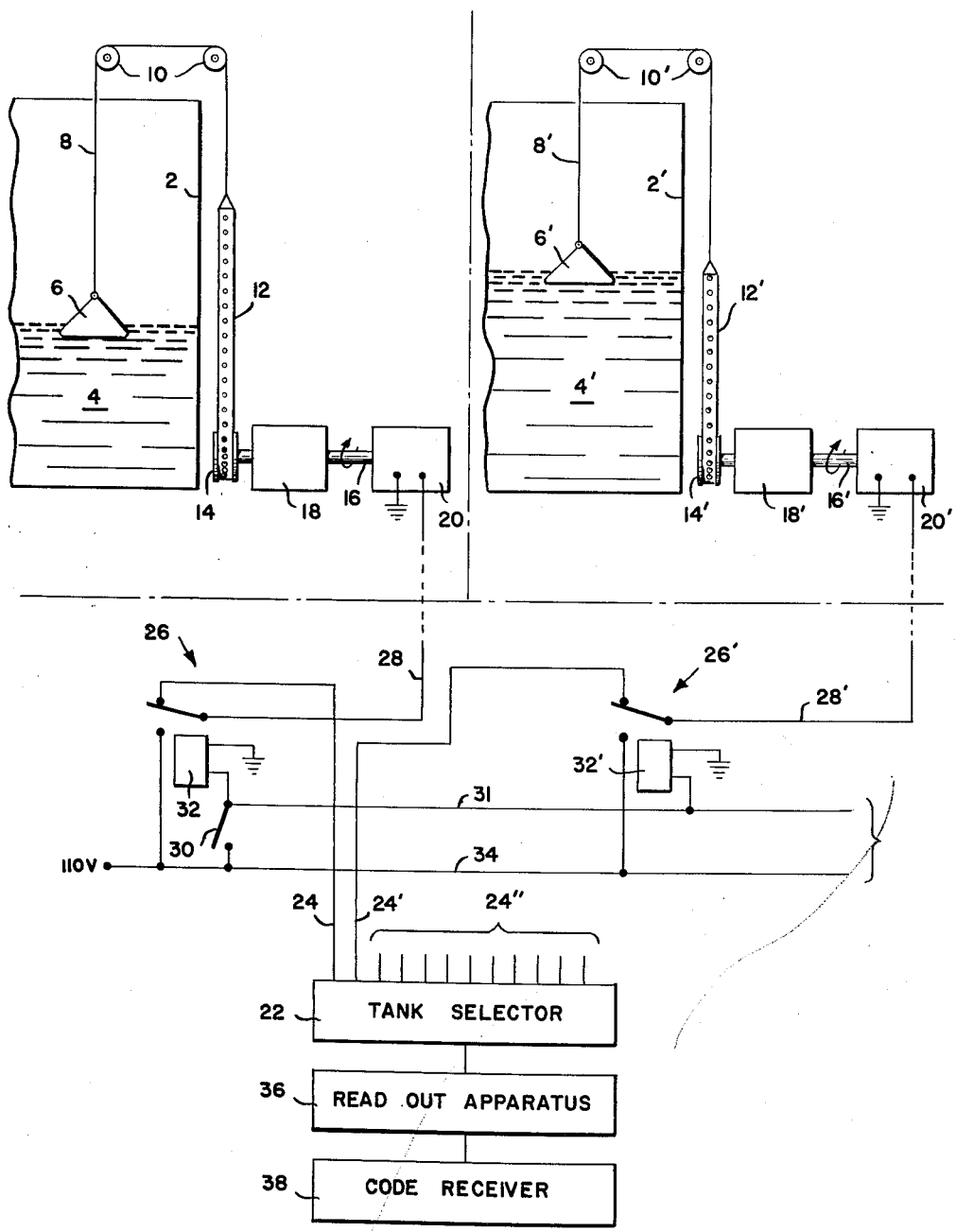
FIGURE 1 is a diagrammatic showing of the various elements of apparatus involved at the local station and at each remote station.

In the embodiment of the invention shown there is involved a plurality of tanks, two of which are indicated at 2 and 2' in FIGURE 1. Each of the tanks contains a quantity of liquid as indicated at 4 and 4', the level of which is sensed by means of a float 6, and the position of the float is transmitted by means of a cable 8 passing over suitable rollers 10 and connected to a perforated tape 12 passing over a sprocket 14 serving to rotate a shaft 16 to a position determined by the level of the liquid 4 in the tank.

A tape tensioning mechanism 18 is provided. This mechanism may be in the form of a spring type motor such as that disclosed in the Patents Nos. 2,647,743; 2,609,191; 2,609,192; 2,609,193.

The output of the shaft 16 is connected through suitable gearing, not shown in FIGURE 1, to a shaft positioned coding device 20 hereinafter referred to as a digitizer. The digitizer 20 is actuated by the float position, provides a coded interpretation of the liquid level and includes sensing means which will sense and retain the coded interpretation, as will be hereinafter described in greater detail.

The local station involves a tank selector switch 22 connected to the individual remote units through conductors 24, 24' and 24" and through normally closed contacts of relays indicated generally at 26, 26' and conductors 28, 28' connected to the digitizers 20, 20', respectively. While relays 26 and conductors 28 are shown for only the conductors 24 and 24', it will be evident that each of the conductors 24" will be similarly connected to a remote unit including remote unit elements similar to those shown in FIGURE 1.

A switch 30 and conductor 31 serve to connect the coils 32, 32' of each of the relays 26, 26' simultaneously to a source of 110 volt power supplied through conductor 34. Upon energization, each of the relays 26, 26' serves to connect its respective conductor 28, 28' to the source of 110 volts thereby supplying the 110 volt power to its digitizer which, as will be hereinafter described, serves to actuate the digitizer causing the digitizer to set up and retain an indication of the coded interpretation of the level of the liquid in the tank existing at the time the switch 30 was closed. Upon deenergization of the relays 32, the relay contacts reestablish connection between the tank selector switch and the digitizers. Thereafter by successively positioning the tank selector switch 22 the individual digitizer codes may be successively read off by read-out apparatus indicated generally at 36. The output of the read-out apparatus is delivered to a code receiver 38. The electrical circuitry involved at the local unit will be hereinafter described in greater detail.

The digitizer indicated schematically by the block 20 in FIGURE 1 will now be described in greater detail in conjunction with FIGURES 2A, 2B and 2C. The tape 12, which is responsive to positions of the tank float shown in FIGURE 1, passes over the tape sprocket 14 and positions the shaft 16. The shaft 16 extends through the tape tension mechanism 18 to a suitable gear reduction device 40. The output shaft 42 of the gear reduction device 40 mounts a code disc 44. The shaft 42 extends to a second gear reduction device 46 the output shaft 48 of which mounts a second code disc 50. The codings on the discs are accomplished by means of projections 52, which are arranged to provide a coded interpretation of tank liquid level.

Figure 2A:
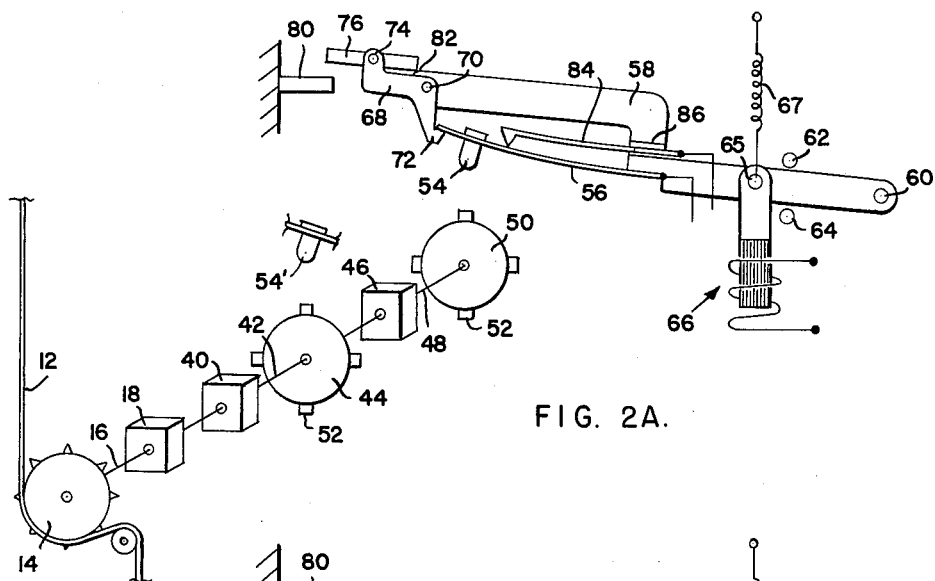
FIGURES 2A, 2B and 2C are detailed showings of apparatus employed at the remote stations in various positions of operation.
Figure 2B:
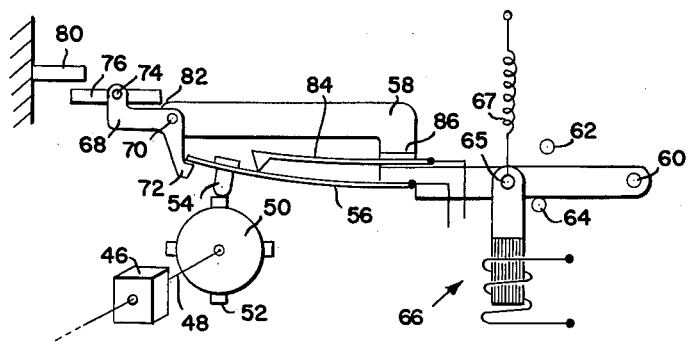

It will be evident that the two disc digitizer shown diagrammatically in FIGURE 2A represents a highly simplified showing of actual apparatus which would involve the use of two drums in the positions of the discs 44 and 50, with each drum composed of a number of coded discs. A straight binary system would involve the use of ten discs on a drum thus providing a code accuracy of one part in 1023. The second drum, i.e., in the position of the disc 50, would be geared down to ratios of 100 to 1 for decimal codes and to ratios of 128 to 1 for binary codes. The arrangement shown represents merely a simplified version of the more complex apparatus generally employed. Such a system is employed in apparatus presently produced by the Fisher and Porter Company and sold under the tradename of Digi-Coder. Patents Nos. 2,247,942 and 2,735,887 disclose such apparatus.

Apparatus for reading the positions of the code discs is identical for each disc and includes, for each disc, an arm 58 pivoted at 60 for motion between stops 62 and 64. An armature of an actuation solenoid indicated generally at 66 is pivoted to the reading arm 58 at 65 and upon energization of the armature coil, as will be hereinafter described, the reading arm 58 is pulled down to the limit permitted by the stop 64. Spring means 67 is provided between the pivot point 65 and a fixed point to raise the reading arm when the solenoid 66 is deenergized.

A contact finger 54 is mounted on a spring leaf 56 affixed to the arm. The reading apparatus for the code disc 44 is shown fragmentarily as contact finger 54'. A bell crank 68 is pivoted to the left-hand end of the reading arm at 70 as viewed in FIGURE 2A, and is provided at its lower end with a hook 72 adapted to engage the outer left-hand end of the spring leaf 56. The left-hand or upper end of the bell crank 68 is pivotally connected at 74 to a plate 76 the left-hand end of which is adapted to engage a stationary abutment 80 when the reading arm 58 is drawn downwardly and the right-hand end of which is adapted to engage the reading arm 58 at 82.

When the reading arms are all in the position of the reading arm 58 in FIGURE 2A, the digitizers are in normal positions. It should be noted that with the arms in this position the spring leaf 56 may or may not be engaged by the hook 72 as will hereinafter become evident. However, when a spring leaf is in this position, a contact arm 84 mounted in the reading arm 58 by means of suitable insulating sleeve 86 is in engagement with the spring leaf 56 and grounded thereby through the apparatus.

When the sampling relays indicated at 26 in FIGURE 1 are operated, all of the digitizer solenoids 66 are energized, as will hereinafter be described, and each reading arm 58 moves downwardly until its reading finger 54 engages its associated coded disc. When the arm 58 shown in FIGURE 2A moves downwardly, the left-hand end of the plate 76 will engage the abutment 80 and be raised thereby rotating the bell crank 68 and releasing the spring leaf 56 from the latch 72. The reading arms 58 are shown in FIGURES 2B and 2C in their lowermost positions in engagement with the stops 64. As shown in FIGURE 2B, when the reading arm 58 is depressed and the reading finger 54 is in engagement with a raised portion 52 of the coded disc, the left-hand end of the spring leaf 56 will just clear the hook 72 and the bell crank 68 aided by the weight of the plate 76 will swing in a counterclockwise direction and assume the position shown whereupon, upon subsequent deenergization of the relay 66 and raising of the reading arm 58, the plate 76 will rotate as it passes the abutment 80 and the reading arm will move to an uppermost position as shown in FIGURE 2A with the spring leaf in engagement with the hook 72 and the contact arm 74 in engagement with and grounded by the spring leaf 56.

Figure 2C:
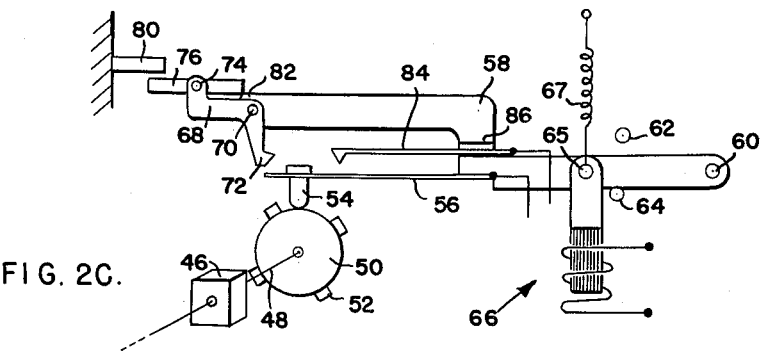

When the reading arm 58 is drawn downwardly and the reading finger 54 is not over a raised portion of its associated code disc, the arm 58 and spring leaf 56 will assume positions as shown in FIGURE 2C with the left-hand end of the spring leaf displaced from the hook 72. In this case, when the reading arm returns to an uppermost position the spring left 56 and the contact arm 84 will not be in engagement with each other and thus the contact arm 84 will not be grounded.

It will thus be evident that upon energization of the armatures 66 each reading arm will have its associated contacts positioned in either grounded or ungrounded position depending upon whether or not a raised portion or a non-raised portion of its associated reading disc was encountered by the reading finger. Thus, the reading arm contacts serve to take off and retain the coded interpretation of the tank level existing at the time of energization of the solenoids 66 resulting from operation of the sampling relays 26 shown in FIGURE 1. It should be noted that, as previously described, operation of all of the sampling relays 26 results from operation of the switch 30 and thus reading arms of all of the digitizers are actuated at the same time providing a simultaneous recording by the reading arms of all of the digitizers of the coding set up by their associated code discs.

It is also noted that, as previously described, while FIGURE 2A shows simplified apparatus involving only two coding discs and two reading arms for each digitizer, actual apparatus would employ, for example, two coding drums of approximately ten discs each with a reading arm positioned for cooperation with each disc.

Figure 3:
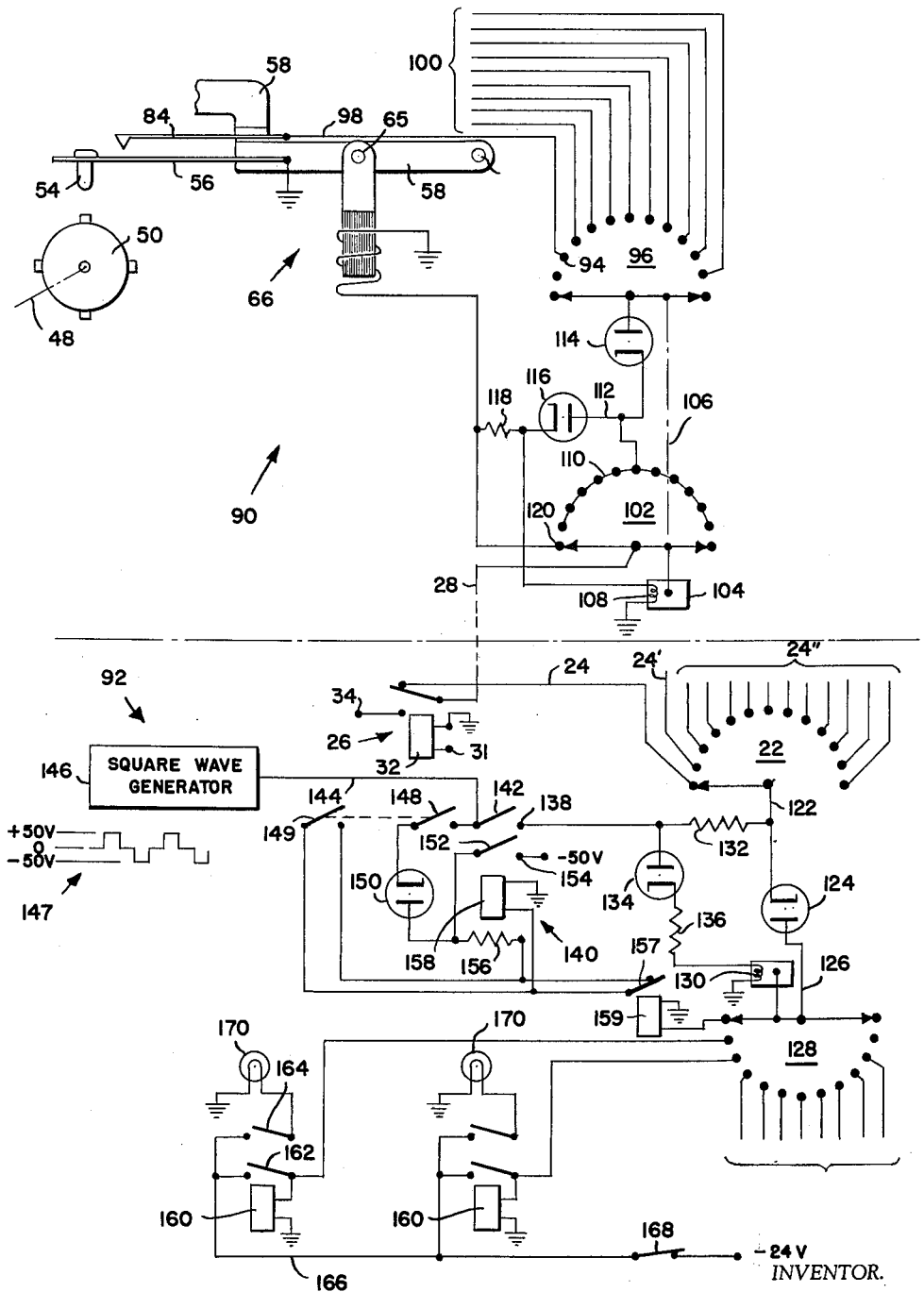
FIGURE 3 is a wiring diagram of the electrical circuit involved at one remote station and at the local station.

In FIGURE 3 there is indicated generally at 90 a single remote station and there is indicated generally at 92 a local station adapted to receive the coded interpretation from each of a plurality of remote stations.

In FIGURE 3, in order to simplify the drawing, there is shown only a single code disc 50 and its reading arm 58 with associated reading finger 54 and contact arm 84 as described in connection with FIGURES 2A-C. The contact arm 84 is connected to the third terminal 94 of a stepping switch 96 through a conductor 98. The additional contact arms of the other reading arms of the digitizer, not shown in the drawing, are connected successively to the subsequent contact points of the stepping switch through conductors indicated within the bracket 100. As previously noted, while only two code discs are shown in connection with FIGURES 2A-C, actually in practice a set of ten code discs would be employed with each of two drums positioned in the position of the discs 50 and 52 shown in FIGURE 2A. In FIGURE 3, the arrangement indicated at the remote station and at the local station provides for the taking off of the coding from one drum composed of ten discs. It will be evident that in order to provide for the take off of the coding from two drums of ten discs each all that is needed is an increase in the number of conductors represented at 100 from ten to twenty with a corresponding increase in the number of contacts in the stepping relays 96, 102 and 128, and a corresponding increase in the number of storage relays 160.

At the remote station, a second stepping switch 102 is driven in synchronism with the stepping switch 96 through mechnical drive means, indicated diagrammatically at 106, by a solenoid released spring driven mechanism indicated diagrammatically at 104. The release solenoid is indicated at 108. Spring driven solenoid release stepping switches of this type are well known in the art and need not be described in detail herein.

All of the contacts of the switch 102 except the zero contact 120 are connected together by a conductor 110. The conductor 110 is connected through a conductor 112 to the cathode of a diode 114 having its anode connected to the arm of the switch 96. The conductor 112 is also connected to the anode of a diode 116 the cathode of which is connected to the solenoid coil 108. The cathode of diode 116 is also connected through a resistor 118 to a zero contact 120 of the switch 102 and to the coil of the reading arm solenoid 66. While a plurality of reading arms 58 are provided, as heretofore described, only a single solenoid 66 need be provided if a common pivot pin 65 extends through each of the reading arms 58.

In the local station, indicated generally at 92, there is included the sampling relay 26 heretofore described and the tank selector 22 heretofore described in connection with FIGURE 1. One contact of the tank selector switch 22 is connected through a conductor 24 to the sampling relay 26 and is connected through the normally closed contact of the sampling relay to the arm of the stepping switch 102 through the single conductor 28 previously described. It should be particularly noted that, except for a ground connection, the conductor 28 is the only connection between the local station and the remote station. The additional connections 24' and 24" from the tank selector switch 22, as described in connection with FIGURE 1, are shown connected to the various terminals of the selector switch 22 in FIGURE 3.

The movable arm of the selector switch 22 is connected through a conductor 122 to the cathode of a diode 124 the anode of which is connected through a conductor 126 to the movable arm of a spring driven stepping switch 28, successive releases of which are affected by a solenoid coil 130. The conductor 122 is connected through a resistor 132 to the anode of a diode 134 the cathode of which is connected through a resistor 136 to the solenoid coil 130.

The anode of the diode 134 is connected to a stationary contact 138 of a starting relay indicated generally at 140. A movable contact 142 of the relay is adapted to engage the contact 138 and is connected through a conductor 144 to a square wave generator 146. The output wave of this generator is indicated at 147 as having 50 volt positive and negative excursions. A start switch 148 is connected between the conductor 144 and the cathode of a diode 150 the anode of which is connected to a second movable contact 152 of the start relay 140. A stationary contact 154 adapted to be engaged by the movable contact 152 is connected to a negative source of 50 v. D.C. power.

The anode of the diode 150 is connected through a resistor 156 and a stop relay contact arm 157 to one side of the coil 158 of the relay 140 and the other side of the coil is connected to ground. The coil 159 of the stop relay contact is connected between ground and the home or zero contact of the stepping relay 128. A normally open switch 149 is connected in parallel with the switch 157 and is mechanically linked to operate with the start switch 148.

Each contact of the stepping switch 128 is connected to one side of an associated relay coil 160 the other side of which is connected to ground. Each relay 160 is provided with a pair of movable contacts 162 and 164. The stationary contacts adapted to be engaged by the movable contacts when the relay is energized are connected to a source of negative 24 volt D.C. power through conductor 166 and a normally closed reset switch 168. The contact 162 serves to seal in the relay coil and the contact 164 serves to connect a lamp 170 between ground and the 24 volt source. Thus, if at the time the stepping switch arm crosses a given contact of the switch a potential is applied to the arm, the relay 160 associated with that switch contact will be energized and its associated lamp 170 will be illuminated. On the other hand, if at the time the stepping switch arm crosses a given contact of the switch there is no potential applied to the arm, the associated relay 160 will not be energized and the associated lamp 170 will not be illuminated.

In operation of the apparatus, when it is desired to determine the levels of the liquids in all of the tanks simultaneously, the switch 30 is closed, energizing all of the sampling relays 26. Operation of each relay imposes power from the 110 volt source connected to line 34, on its associated circuit through its conductor 28 to the arm of stepping switch 102 and from terminal 120 of the switch 102 to the coil of the sampling relay 66 whereupon the reading arms of each of the digitizers are moved downwardly and the coded interpretation of tank levels presented by the code discs at that instant of time is sensed and retained by the reading arm contacts as previously described. Upon opening of the switch 30 the sampling relays are deenergized and the reading arms 58 lift the reading fingers 54 from the code discs whereupon the grounded and non-grounded conditions of the various contact elements 84 as established by the code discs will remain until they can be read from the local station.

The contact arms of the stepping switches 96 and 102 are shown in their zero or home positions, and when the contact arms are in these positions the reading arms 58 are ready to read and record the coded interpretation of the tank level. After this reading is made, the stepping switches 96 and 102 will be in the first position from the home position. They are then prepared to read the conditions of the contact elements 84 on the reading arms.

At the time the sampling relay is operated, a potential is applied through resistor 118 to the relay coil 108 and, when the 110 volt source is disconnected from the coil 108, the switches 96 and 102 advance to their number one positions. At this time, the level of each tank has been recorded in code on the digitizer in that tank. There now remains the reading and recording at the local station of the information stored in each digitizer.

The remote stations are successively read and the station to be read is determined by the position of the arm of the tank selector switch 22 at the local station which, as previously described, is successively positioned to provide for reading the remote stations successively one at a time.

The read-out is controlled by the square wave signal produced by the square wave generator 146 which passes from zero v. to +50 v. to zero v. to −50 v. to zero v. etc. The +50 v. pulses are used to step the remote stepping switches 96 and 102 and the local stepping switch 128, and the −50 v. pulses are used to set successive code receiver relays 160 if the successive contacts on the digitizer are open, as will be more fully described.

To start the read-out, the contacts 148 and 149 are momentarily closed and the first negative pulse passing thereafter from the square wave generator 146 passes through the diode 150 and switch 149 closing the relay 140. The next following positive pulse from the square wave generator passes through the closed contact arm 142, through the tank selector switch 122, the stepping switch 102, the diode 116 to the relay coil 108. Upon termination of this pulse the stepping switches 102 and 96 advance to their first code receiving position, i.e., a movable arm of the stepping switch 96 is now on the contact point 94. This same positive pulse was delivered through diode 134 to relay coil 130 of the stepping switch 128, which upon termination of the pulse advances to its first operative position, i.e., to a position connecting its switch arm with the coil 160 of the first of the code receiver relays. The system is now in condition to store the coded information of the first reading arm of the digitizer.

When the stepping switch 128 has moved from its home position, relay coil 159 is open circuited, contact switch 157 is closed and relay 140 is locked into closed position through contact 152, thus, the manually operated start switches 148, 149 may be released and opened.

If the reading arm contact on the digitizer is open, the next negative pulse from generator 146 will pass through the diode 124 and operate the first code receiver relay 160 and illuminate the first code receiver lamp 170. If the reading arm contact on the digitizer is closed, the entire −50 v. pulse will be absorbed by the resistor 132 and no voltage will be available to operate the code receiver relay 160.

The next successive positive pulse steps the stepping switches 96 and 128 to the next code position and the next successive negative pulse records the contact arm condition of the next successive reading arm of the digitizer on the next relay 160 and associated lamp 170. This process is repeated until all of the reading arm contact conditions have been read and the coded information stored in the code receiver relays 160.

While the code receiver relays and lamps disclosed represent a rather elementary means for recording the coded interpretation contained by a digitizer, it will be evident that in place of the lamps 170 there may be provided various binary or decimal converters and the results may be printed by suitable printing mechanisms. It will also be evident that the specific voltages referred to herein are merely illustrative of voltages possibly employed and in no way represent limitations upon the apparatus which may be employed.

The stepping is continued until the stepping switches reach their home or zero positions as shown in FIGURE 3. At this time the relay coil 159 is energized, switch 157 opens, the readout start relay 158 is deenergized and contacts 142 and 152 open, arresting the readout operation.

The selector switch 22 may now be moved to connect the local station with the next successive remote station, and the read-out apparatus may be re-initiated by closure of the start contacts 148 and 149.

It may be noted that the stepping switches employed to read the code from the digitizer are operated at about ten steps per second; thus, the manual depression of the start button need be substantially only instantaneous, and it will be evident that the stepping relays must stop in their home positions in order to be properly positioned for the next successive read-out operation. Thus, the automatic stop of the digitizer sequence is necessarily employed.

As previously noted, the stepping switches employed to read the code from a digitizer will operate at about ten steps per second. With such apparatus the time required to read-out the levels in a tank farm would be approximately three seconds per tank. If twenty code points are used, then only two seconds are required to scan the code. Thus, the apparatus provides for the relatively rapid successive reading of stored coded interpretations of the levels existing simultaneously in a plurality of tanks.

The apparatus heretofore described reads the static location of a float in a fluid. The accuracy of a tank gauge is improved by pulling the float out of the liquid when it is desired to read the gauge and reading the float level at which the float breaks away from the surface of the liquid, this break-away being attended by peak loading on the float pull-out apparatus. Such an apparatus is shown in FIGURE 4.

Figure 4:
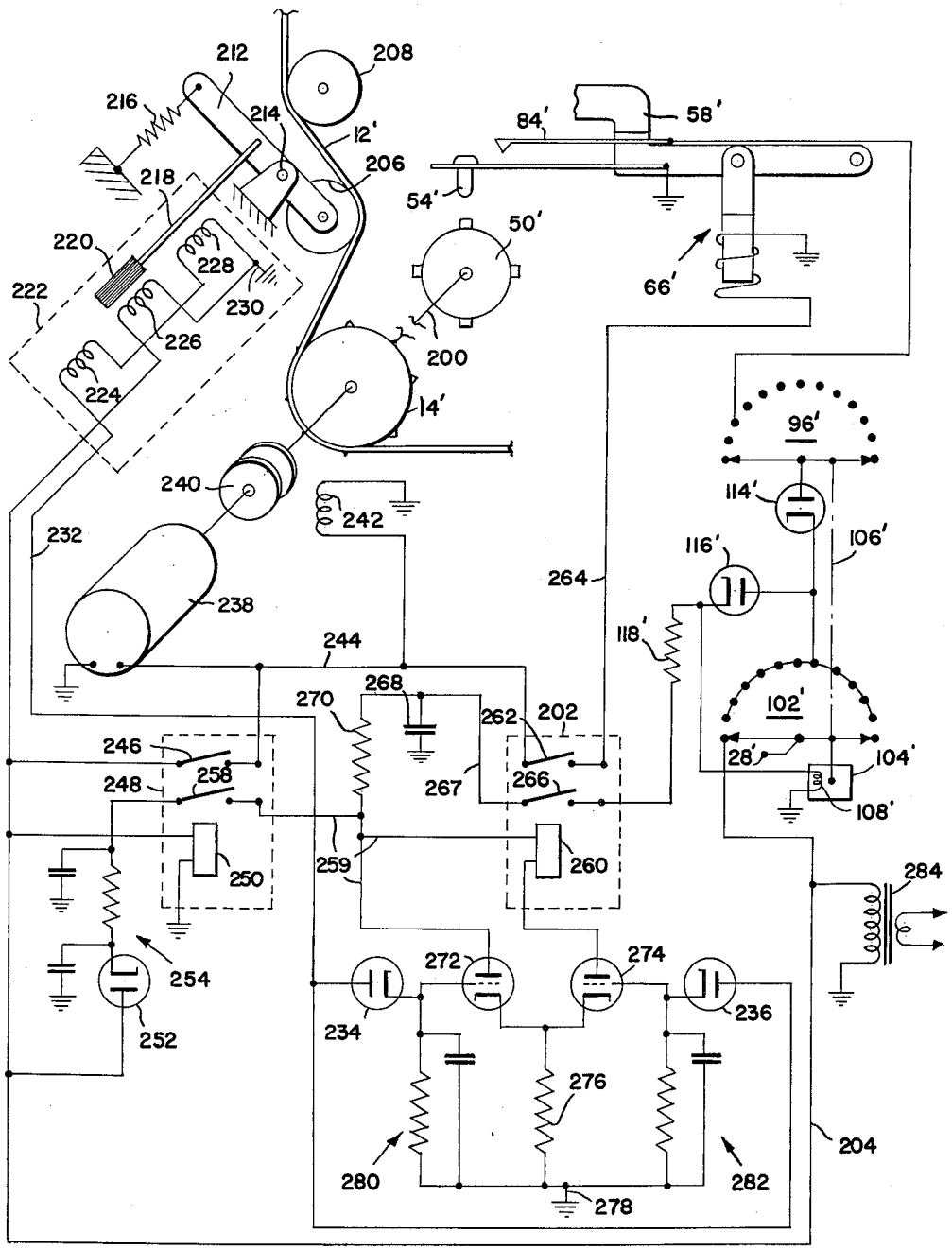
FIGURE 4 is a diagrammatic showing of apparatus involved at the remote stations embodying a modification of the invention.

In FIGURE 4 there is shown a perforated tape 12' equivalent to the tape 12 shown in FIGURES 1 and 2 connected to a float within a tank. The tape passes over a sprocket 14' which is connected by means of a shaft 200 to a stack of coded discs such as the disc indicated at 50'. This connection is effected through tape tensioning means and gear reduction means similar to those shown in FIGURE 2A but not shown in FIGURE 4.

Each of the coded discs 50 has associated therewith a reading arm 58' mounting a contact finger 54' and a contact arm 84'. The elements thus far described in connection with FIGURE 4 are identical to the corresponding elements described in connection with FIGURES 1 and 2.

In FIGURE 4 there are also shown stepping switches 96' and 102'. Employed with these switches are diodes 114' and 116' and switch actuating means 108' and 106'. These elements are each identical to the corresponding elements described in connection with FIGURE 3.

In FIGURE 4 a resistance 118', equivalent to the resistance 118 shown in FIGURE 3, is connected between the cathode of the diode 116' and a contact of a relay 202 which will be hereinafter described.

The contact arm of the stepping relay 102' is connected through conductor 28' to the contact arm of the relay 26 shown in FIGURES 1 and 3, and when the relay 26 is energized for connection to a 110 v. A.C. power supply, the zero or home contact of the stepping relay 102' is connected to a conductor 204 and, unlike the home contact of the stepping relay 102 shown in FIGURE 3, is not connected to the coil 66' of the reading arm armature. Connections to the conductor 204 will hereinafter be described.

The perforated tape 12' passes over a tension roller 206 positioned between the sprocket 14' and an idler roller 208. The tension roller 206 is mounted on an arm 212, pivotally mounted at 214 and provided with a spring 216, urging the roller 206 against the perforated tape. One end of an arm 218 is pivotally connected to the arm 212 and a magnetic core 220 is affixed to its opposite end. The core 220 is the movable core of a differential transformer 222.

The differential transformer includes three coils 224, 226 and 228 in linear array adjacent to the path of movement of the magnetic core 220. The center coil 226 is connected between the conductor 204 and ground as indicated at 230. The other two coils 224 and 228 are connected in series between ground at 230 and a conductor 232 which is connected to the plates of a pair of diodes 234 and 236.

A motor 238 is connected through a solenoid operated clutch 240 having a coil 242 to drive the sprocket 14' and to raise the float out of the liquid in the tank when it is desired to read the level within the tank. The motor 238 and the clutch coil 242 are connected through a conductor 244 to a contact 246 of a time delay relay 248. The contact 246 serves to connect the motor and clutch coil to the conductor 204 when the relay 248 is energized and closed. The coil 250 of the time delay relay is connected between the conductor 204 and ground.

A D.C. power supply including a diode 252 and a ripple smoothing circuit indicated at 254 is connected between the conductor 204 and a contact 258 of the time delay relay. Closure of the contact 258 connects the output of the D.C. power supply to one side of the coil 260 of the relay 202. The conductor 244 is connected through a contact 262 of the coil 202 and through a conductor 264 to the coil of the reading arm actuation solenoid 66'.

The resistance 118' previously mentioned is connected through a contact arm 266 of the relay 202 to a conductor 267. A capacitance 268 is connected between the conductor 267 and ground. A resistance 270 is connected between the conductor 267 and the conductor 259. The conductor 259 is also connected to the plate of a triode 272 and the other side of the coil 260 of the relay 202 is connected to the plate of a triode 274. The triodes 272 and 274 have their cathodes joined together and connected to ground 278 through a common cathode resistance 276. The grid of the triode 272 and the cathode of the diode 234 are connected together and are connected to one side of a RC detector circuit indicated generally at 280. The other side of the RC detector circuit is connected to ground 278. The grid of the triode 274 and the cathode of the diode 236 are connected together and are connected to one side of a RC detector circuit indicated generally at 282. The other side of the detector circuit is connected to ground 278.

When it is desired to read the tank level at the remote station shown in FIGURE 4, the sampling relay 32 shown in FIGURES 1 and 3 will be energized and a 110 v. A.C. power supply will be connected to conductor 28' and through the arm of the stepping switch 102' to the conductor 204. Thus, the power supply is connected to the time delay relay 248, the D.C. power supply 252, 254, the differential transformer 222 and the filament transformer 284 which provides filament current for the tubes in the control circuit. The time delay relay 248 has its closing delayed for a sufficient time to give the D.C. power supply and the tube filaments time to heat. When the time delay relay 248 closes and energizes the motor 238 and the clutch coil 242 the motor slowly raises the float in the liquid in the tank. As the float is raised, the tension on the tape 12' gradually increases, causing the spring loaded pulley to move and causing the magnetic core 220 to be displaced. This displacement causes the output signal of the differential transformer to increase. As the float breaks away from the surface of the liquid in the tank, this tension crosses a maximum peak value and then decreases slightly but rapidly to a value representing the force necessary to raise the weight of the float in air.

As the signal from the differential transformer increases the rectified signals delivered to the grids of the triodes 272, 274 through their respective associated diodes increase together and, thus, the current passing through both of the triodes will be approximately equal. However, the RC detector circuit 280 has a short time constant whereas the RC detector circuit 282 has a long time constant, and thus when the signal decreases sharply, as occurs when the float breaks through the surface of the liquid in the tank, the grid potential of the triode 274 remains at a relatively high value due to the longer time constant of the RC circuit 282. Thus, the grid of triode 274 becomes more positive than the grid of triode 272 causing a relatively large increase in the current through the coil 260 of the relay 202, actuating the relay.

When relay 202 is actuated to close contact 262, power from the 110-volt source (now connected to conductor 28') is supplied to the digitizer solenoid 66', whereupon the reading arms 58' of each of the digitizers are moved downwardly, and the coded interpretation of tank levels presented by the code discs at that instant of time is sensed, as previously described in connection with FIGURE 3.

While the motor was raising the float through the liquid in the tank the capacitance 268 was being charged through resistance 270. When the relay 202 is actuated by the current through its coil 260 the capacitance 268 discharges through contact 266, resistance 118' and the stepping relay coil 108' causing the stepping relay 102' to step to its first position. This actuation of the stepping relay 102' opens the connection between the 110 v. A.C. power supply and the conductor 204 deenergizing the control circuit and the float raising motor 238 and the clutch coil 242. When the power is removed from conductor 204, digitizer solenoid 66' is deenergized so that the reading arms 58' of the digitizer return to their normal positions; however, the coded interpretation of tank levels is retained by the reading arm contacts, as previously described in connection with FIGURE 2. That is to say, the reading arms 58' lift the reading fingers 54' from the code discs, whereupon the grounded and non-grounded conditions of the various contact elements 84', as established by the code discs, will remain until they can be read from the local station, as described in connection with FIGURE 3. Also, the deenergization of the motor 238 and the clutch coil 242 permits the float to be dropped back into the liquid. These last operations take place in rapid sequence after the tape tension peak has been passed. The sampling is now complete and read-out of the digitizer can be accomplished in the manner described in connection with the apparatus shown in FIGURE 3.

It may be noted that various other types of tension measuring devices may be employed in place of the differential transformer and control circuit arrangement disclosed herein. Other transducer arrangements are described in the copending patent applications of F. M. Mayes, Serial No. 493,367, filed March 10, 1955, now Patent No. 2,899,751, dated October 18, 1959, and Serial No. 506,056, filed May 4, 1955, now Patent No. 2,930,131, dated March 29, 1960. The essential consideration involved is that the coded reading retained by the reading arms of the digitizer represents a reading taken at the instant the float breaks away from the surface of the liquid in the tank.

It will be evident from the foregoing that the remote reading apparatus disclosed herein represents a relatively simple and highly accurate means for providing for the reading of the levels simultaneously existing in a plurality of tanks and of accomplishing this by means of only a single centrally located read-out apparatus. Furthermore, while the employment of the invention disclosed herein has been described as being associated with the reading of a tank level, it will be evident that numerous sensing devices may be employed to position digitizer code discs, and that these coded values may be read by the apparatus disclosed herein.

What is claimed is:

1. Apparatus comprising means at each of a plurality of remote stations substantially continuously providing a coded interpretation of a variable condition, means at each of the remote stations controlled from a central station for simultaneously momentarily sensing said coded interpretations and retaining the sensed code, means at each of the remote stations controlled from the central station for reading said sensing means and for transmitting the reading to the central station, and means at the central station for successively receiving readings transmitted by said transmitting means.

2. Apparatus comprising means at each of a plurality of remote stations providing a coded interpretation of a variable condition at that station, means at each of said remote stations actuated simultaneously from a central station for storing the coded interpretations simultaneously existing at said remote stations, means at the central station for simultaneously actuating each of said code storing means, means at each of said remote stations actuated from the central station for transmitting the coded interpretation stored by the storing means, means at the central station for successively actuating said code transmitting means, and means at the central station for receiving the successively transmitted coded interpretations.

3. Apparatus comprising means at each of a plurality of remote stations providing a coded interpretation of a variable condition at that station, means at each of said remote stations actuated simultaneously from a central station for sensing and storing the coded interpretations simultaneously existing at said remote stations, means at the central station for simultaneously actuating each of said code sensing and storing means, means at each of said remote stations actuated from the central station for reading and transmitting the coded interpretation stored by the sensing and storing means, means at the central station for successively actuating said code reading and transmitting means, and means at the central station for recording the successively transmitted coded interpretations.

4. Apparatus comprising means at each of a plurality of remote stations for indicating a condition, means at each of the remote stations providing a coded interpretation of an indication by said indicating means, means at each of the remote stations for momentarily sensing said coded interpretations and retaining the sensed code, means at each of the remote stations controlled from a central station for simultaneously actuating said indicating means, said coded interpretation providing means and said sensing means, means including means at each of the remote stations controlled from the central station for reading said sensing means and for transmitting the reading to the central station, and means at the central station for successively receiving readings transmitted by said transmitting means.

References Cited in the file of this patent

UNITED STATES PATENTS

| | | |
|---|---|---|
| 2,444,202 | McAlpine | June 29, 1948 |
| 2,504,999 | McWhirter et al. | Apr. 25, 1950 |
| 2,719,284 | Roberts | Sept. 27, 1955 |
| 2,748,373 | Hosmer | May 29, 1956 |
| 2,771,599 | Nolde et al. | Nov. 20, 1956 |
| 2,835,884 | Markow | May 20, 1958 |
| 2,957,046 | Freeman | Oct. 18, 1960 |